A

(12) United States Patent
Wu et al.

(10) Patent No.: US 9,983,725 B2
(45) Date of Patent: May 29, 2018

(54) MUTUAL CAPACITANCE SENSING CIRCUIT WITH INCREASED SENSITIVITY

(71) Applicant: FREESCALE SEMICONDUCTOR, INC., Austin, TX (US)

(72) Inventors: Xiaolei Wu, Tianjin (CN); Liang Qiu, Tianjin (CN)

(73) Assignee: NXP USA, INC., Austin, TX (US)

( * ) Notice: Subject to any disclaimer, the term of this patent is extended or adjusted under 35 U.S.C. 154(b) by 132 days.

(21) Appl. No.: 15/253,906

(22) Filed: Sep. 1, 2016

(65) Prior Publication Data

US 2017/0108980 A1 Apr. 20, 2017

(30) Foreign Application Priority Data

Oct. 14, 2015 (CN) .......................... 2015 1 0820874

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ............................................. G06F 3/041–3/047

USPC .................................................. 345/173–178
See application file for complete search history.

(56) References Cited

U.S. PATENT DOCUMENTS

| | | | |
|---|---|---|---|
| 8,358,142 B2 | 1/2013 | Mahartya | |
| 8,421,774 B2 | 4/2013 | Wang | |
| 8,514,185 B2 | 8/2013 | Hotelling | |
| 8,605,037 B2 | 12/2013 | Philipp | |
| 8,614,587 B1 | 12/2013 | Ogirko | |
| 8,659,306 B2 | 2/2014 | Johannes | |
| 8,779,783 B1 | 7/2014 | Liepold | |
| 8,878,797 B2 | 11/2014 | Erdogan | |
| 8,913,033 B2 | 12/2014 | Salaverry | |
| 8,976,151 B2 | 3/2015 | Tan | |
| 9,030,429 B2 | 5/2015 | Kwon | |
| 2013/0140073 A1* | 6/2013 | Wang | G06F 3/044 174/264 |
| 2014/0176488 A1* | 6/2014 | Jo | G06F 3/0412 345/174 |

* cited by examiner

*Primary Examiner* — Larry Lee
(74) *Attorney, Agent, or Firm* — Charles E. Bergere (57) ABSTRACT

An electronic device includes mutual capacitance sensing circuitry for a capacitive touch pad. The touch pad has pairs of transmit and receive electrodes. The sensing circuitry intermittently charges and discharges the transmit electrode, and then measures corresponding voltage level changes at the receive electrode. A non-linear voltage-to-current converter is used to detect the voltage level changes, which allows for great sensitivity to mutual capacitance changes.

16 Claims, 6 Drawing Sheets

MUTUAL CAPACITANCE SENSING CIRCUIT WITH INCREASED SENSITIVITY

BACKGROUND

The present invention relates to capacitance sensing circuits and, more particularly, to mutual capacitance sensing circuits for capacitive touch-pad interfaces.

A conventional capacitive touch pad has one or more transmit electrodes and one or more receive electrodes, where each transmit electrode is separated from a corresponding receive electrode by a non-conductive gap. Electronic circuitry intermittently measures the mutual capacitance between the pairs of transmit and receive electrodes. When an object such as a finger is moved close to a transmit and receive electrode pair—referred to herein as a touch, the mutual capacitance between the transmit and receive electrodes is altered and this change can be detected by the electronic circuitry, which may consequently determine, if the change in capacitance exceeds some threshold, that a touch has occurred. The conventional circuitry detects the above-described changes in mutual capacitance by measuring a corresponding voltage and using a linear voltage-to-current converter to feed a current integrator whose parameters are monitored to determine a mutual capacitance.

For example, the integrator may include an integrating capacitor, a comparator, and a counter, where the counter counts the number of clock cycles while the voltage of the integrating capacitor rises from a ground or common voltage to a reference voltage, thereby providing an indication of the mutual capacitance between the transmit and receive electrodes. The count number is then compared against a threshold value to determine whether a touch has occurred.

It is advantageous to have sensitive mutual capacitance detection circuitry.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements. Note that elements in the figures are not drawn to scale.

DETAILED DESCRIPTION

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "has," "having," "includes," and/or "including" specify the presence of stated features, steps, or components, but do not preclude the presence or addition of one or more other features, steps, or components. It also should be noted that, in some alternative implementations, the functions/acts noted may occur out of the order noted in the figures.

Figure 1:
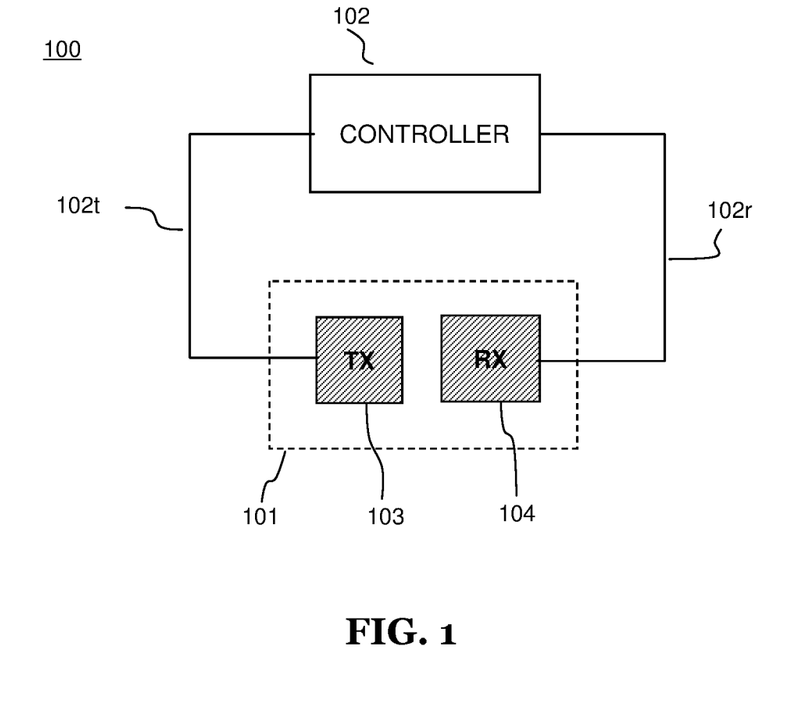
FIG. 1 is a simplified, schematic block diagram of a mutual capacitance sensing circuit in accordance with one embodiment of the present invention.

Referring now to FIG. 1, a simplified block diagram of a mutual capacitance sensing circuit 100 in accordance with one embodiment of the present invention is shown. The circuit 100 comprises a capacitive touch pad 101 and a controller 102. The capacitive touch pad 101 comprises a transmit electrode 103 and a receive electrode 104. Note that the transmit electrodes may also be referred to as drive or send electrodes and the receive electrodes may also be referred to as sense electrodes. The mutual capacitance between the transmit and receive electrodes 103 and 104 is referred to as the mutual capacitance $C_m$. The controller 102 connects to the transmit and receive electrodes 103 and 104 via conductive paths 102$t$ and 102$r$, respectively.

The controller 102 intermittently manipulates the electric charges on the transmit and receive electrodes 103 and 104 and measures related parameters of the receive electrode 104, as explained in further detail below, to detect changes in the mutual capacitance $C_m$ between the transmit and receive electrodes 103 and 104, which may indicate the movement of an object such as a finger into or out of proximity to the transmit and receive electrodes 103 and 104. Note that the approach of a finger close to the transmit and receive electrodes 103 and 104, i.e., a touch, reduces the mutual capacitance $C_m$ between the transmit and receive electrodes 103 and 104. One way to detect changes in the mutual capacitance $C_m$ is to track the value of the mutual capacitance $C_m$ over time, although other ways may be used instead.

The capacitive touch pad 101 may be implemented, for example, on a printed circuit board (PCB), where the electrodes 103 and 104 comprise copper pads printed on an FR-4 substrate of the PCB. The touch pad 101 further comprises a ground plane (not shown) comprising copper traces. The ground plane forms parasitic capacitances $C_{p1}$ and $C_{p2}$, respectively, with the transmit and receive electrodes 103 and 104. Due to the respective geometries, the parasitic capacitances $C_{p1}$ and $C_{p2}$ are several times larger than the mutual capacitance $C_m$. In one implementation, the parasitic capacitances $C_{p1}$ and $C_{p2}$ are each at least five times greater than the mutual capacitance $C_m$.

Figure 2:
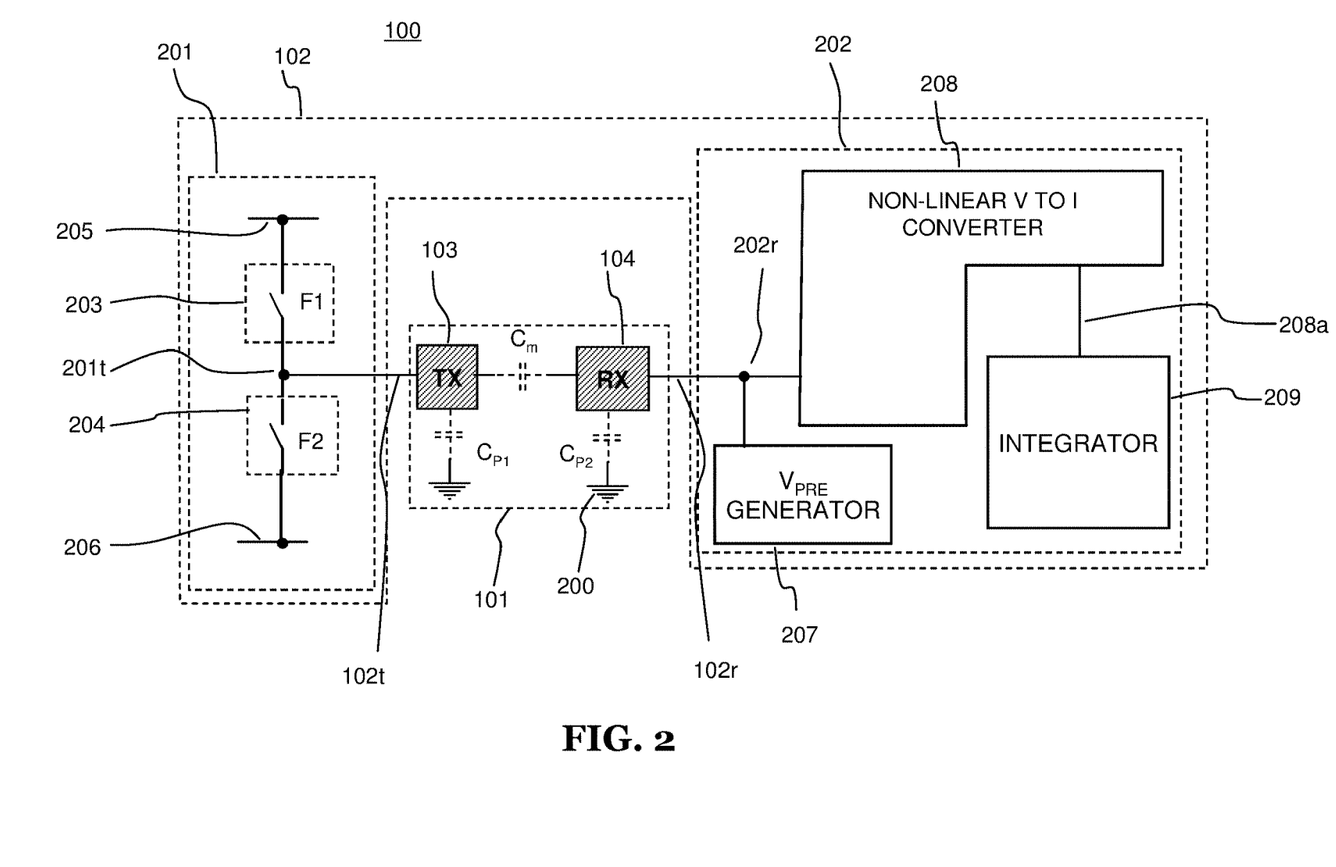
FIG. 2 is a more detailed schematic block diagram of the mutual capacitance sensing circuit of FIG. 1.

FIG. 2 is a schematic block diagram of the mutual capacitance sensing circuit 100 of FIG. 1. The touch pad 101 includes a representation of the above-described ground plane 200, the mutual capacitance $C_m$, and the parasitic capacitances $C_{p1}$ and $C_{p2}$. Note that the touch pad 101 does not use any actual capacitors labeled $C_m$, $C_{p1}$, or $C_{p2}$. Rather, these labels represent capacitance values between the above-described metallic components of the touch pad 101.

The controller 102 comprises a transmit module 201, connected to the transmit electrode 103 via the path 102$t$, and a receive module 202, connected to the receive electrode 104 via the path 102r. The transmit module 201 comprises a first switch 203 connected between a first power rail 205 and a node 201t, and a second switch 204 connected between a second power rail 206, which is at a different voltage from the first power rail 205, and the node 201t. The node 201t is connected via the path 102t to the transmit electrode 103. The power rails 205 and 206 and the switches 203 and 204 operate to intermittently charge and discharge the transmit electrode 103.

The charging and discharging of the transmit electrode 103 causes a corresponding charging and discharging of the receive electrode 104 to voltage levels whose magnitude depends on the mutual capacitance $C_m$. The magnitude $\Delta V$ of the change in the voltage level of the receive electrode 104 is detected by the receive module 202 via the path 102r.

The receive module 202 comprises a pre-charge voltage ($V_{pre}$) generator 207, a non-linear voltage-to-current converter 208, and an integrator module 209. The $V_{pre}$ generator 207 generates a pre-charge voltage $V_{pre}$, which is provided to the path 102r. The pre-charge voltage $V_{pre}$ is used to ensure proper operation of the converter 208. The voltage $V_{104}$ at the node 202r is the sum of the pre-charge voltage $V_{pre}$ and the change $\Delta V$ in the voltage of the receive electrode 104 caused by the charging or discharging of the transmit electrode 103. Based on the voltage $V_{104}$, which may be considered a control voltage for the non-linear converter 208, the non-linear converter 208 outputs a corresponding current via a path 208a to the integrator module 209.

The integrator module 209 tracks a value corresponding to the integral of the current on the path 208a over a predetermined number of clock cycles. Based on this tracked integrated value, additional circuitry (not shown) determines whether the value of the mutual capacitance $C_m$ indicates the approach and/or retraction of a finger to and/or from the touch pad 101. As described below, the additional circuitry may compare the determined mutual capacitance value or a corresponding value to one or more threshold values and, depending on the result of the comparison, determine whether a finger is present or not.

Figure 3:
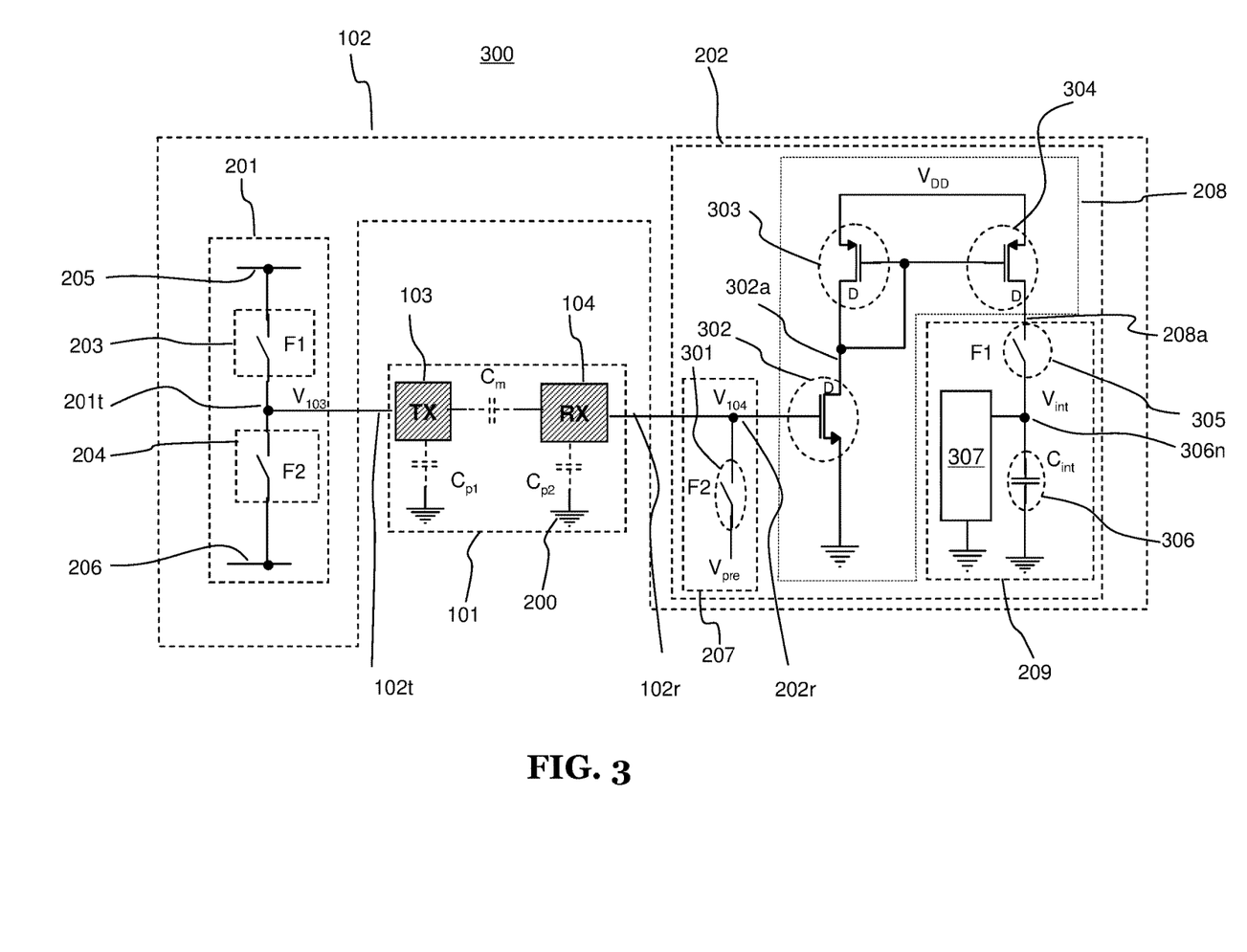
FIG. 3 is a schematic circuit diagram of the mutual capacitance sensing circuit of FIG. 2 in accordance with one embodiment of the present invention.
Figure 4:
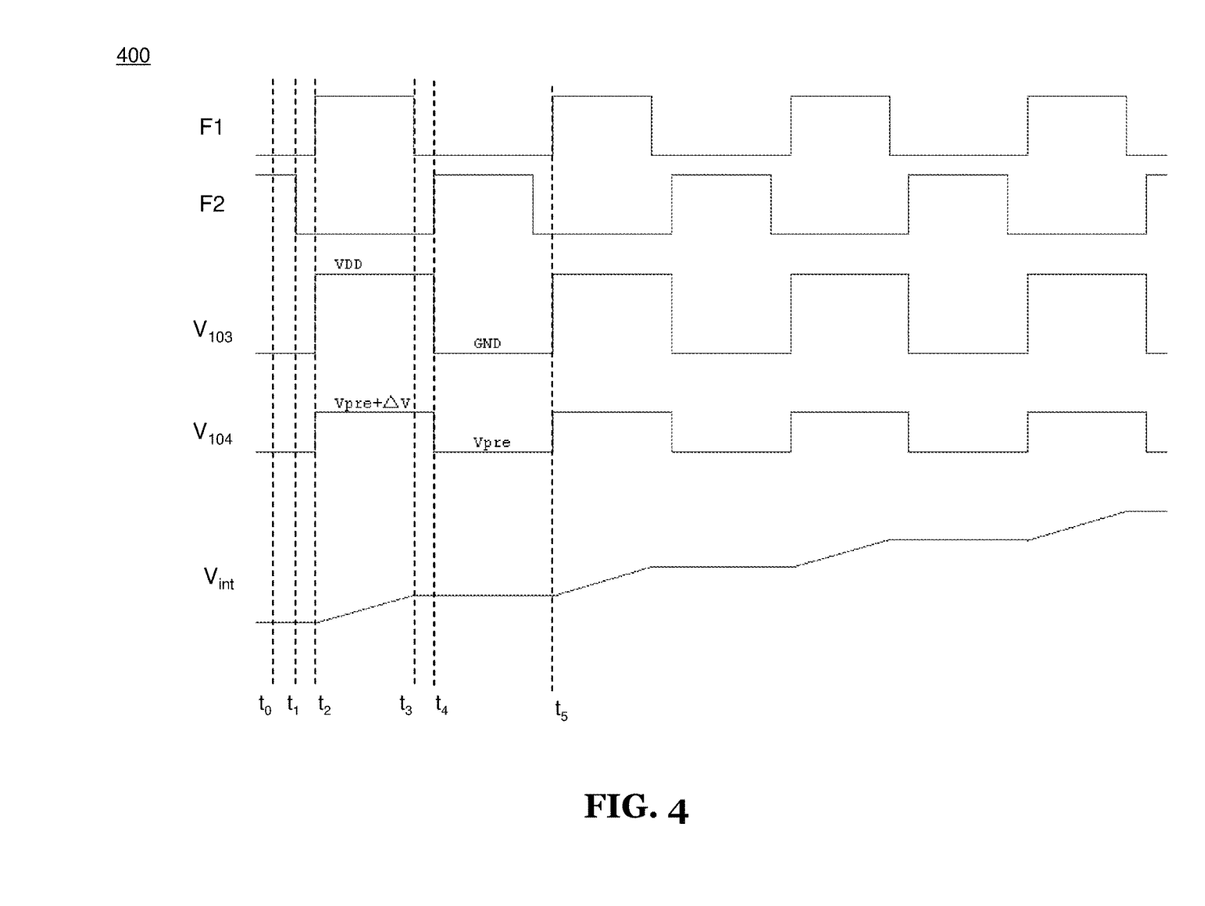
FIG. 4 is an exemplary timing diagram for select signals and nodes of the circuit of FIG. 3.

FIG. 3 is a schematic circuit diagram of a mutual capacitance sensing circuit 300 in accordance with an embodiment of the present invention, and FIG. 4 is an exemplary timing diagram 400 for select signals and node voltages of the circuit 300.

In the transmit module 201, the first power rail 205 is at a supply voltage $V_{DD}$, and the second power rail 206 is at a ground voltage. The first switch 203 is controlled by a clock signal F1, while the second switch 204 is controlled by a clock signal F2. The timing diagram 400 includes corresponding exemplary clock signals F1 and F2. The clock signals F1 and F2 are non-overlapping asymmetrical clock signals that may be generated by one or more corresponding clock generators (not shown).

The clock signals F1 and F2 are considered non-overlapping since, in normal operation, they do not have overlapping high states, as that would create a short circuit from the first power rail 205 to the second power rail 206 through the switches 203 and 204. The clock signals F1 and F2 are asymmetrical since, for each signal, over the period of one clock cycle, its time high is not the same as its time low. Note that, in alternative embodiments, the clock signal F1 and/or the clock signal F2 may be symmetrical. As the switches 203 and 204 turn on and off, the voltage $V_{103}$ at the node 201t, and, consequently, of the transmit electrode 103, goes between $V_{DD}$ and ground.

The $V_{pre}$ generator 207 comprises a $V_{pre}$ voltage source (not shown) connected via a third switch 301 to the node 202r. The $V_{pre}$ voltage source may, for example, comprise a fixed or adjustable voltage regulator. Note that using an adjustable voltage regulator provides greater flexibility in adjusting the sensitivity of the circuit 300 since it allows for dynamic adjustment of the pre-charge voltage $V_{pre}$. The third switch 301 is controlled by the same clock signal F2 used in the transmit module 201. The $V_{pre}$ generator 207 functions to keep the voltage $V_{104}$ at the node 202r at a minimum voltage of $V_{pre}$ during normal operation.

In this embodiment, as shown in FIG. 3, the voltage-to-current converter 208 comprises a first transistor 302 having a gate connected to the receive electrode 104 of the touch pad 101 as well as to the third switch 301. The first transistor 302 has a source connected to ground and a drain connected to both a drain and a gate of a second transistor 303. The gate of the second transistor 303 also is connected to a gate of a third transistor 304. The sources of the second and third transistors 303 and 304 are connected together. A drain of the third transistor 304 is connected to a fourth switch 305 of the integrator 209. The first transistor 302 may be an NMOS transistor, while the second and third transistors 303 and 304 may be identically sized PMOS transistors that form a current mirror circuit.

The voltage $V_{pre}$ is a constant voltage that is set so that the sum of $V_{pre}$ and $\Delta V$ is greater than the threshold voltage $V_{th}$ of the first transistor 302. In other words, $V_{pre}+\Delta V>V_{th}$. Since, in normal operation, $\Delta V$ is always positive, the voltage $V_{pre}$ may be set to be equal to the voltage $V_{th}$ and, consequently, satisfy the above inequality. Note that, although substantially steady, the voltage $V_{pre}$ may at times be changed during operation, as described further below.

The current through the first transistor 302 depends on the voltage $V_{104}$ at the node 202r since the receive electrode 104 is connected to the gate of the first transistor 302 via the path 102r. The current through the first transistor 302 is necessarily the same as the current through the second transistor 303. Because of the current mirroring by the second and third transistors 303 and 304, substantially the same current flows through the third transistor 304 and the path 208a when possible. Note, however, that, in alternative implementations, the transistors 303 and 304 may have different sizes to generate a proportional mirror current, where the ratio of the currents through the transistors 303 and 304 is equal to the ratio of the sizes of the transistors 303 and 304. This may be useful if, for example, larger or smaller currents would enhance or otherwise usefully affect the operation of the integrator module 209.

The integrator module 209 comprises a fourth switch 305, a capacitor 306, and a discharge circuit 307. The fourth switch 305 is connected between the path 208a and a node 306n. The fourth switch 305 is controlled by the same clock signal F1 used in the transmit module 201. The capacitor 306 is connected between the node 306n and ground. The discharge circuit 307, which determines a present value for the mutual capacitance $C_m$ and discharges the capacitor 306, is connected in parallel with the capacitor 306. The capacitor 306 has a capacitance $C_{int}$. The voltage $V_{int}$ is the voltage level across the capacitor 306 as measured at the node 306n.

When the clock signal F1 is high, the fourth switch 305 is closed, and a charging current $I_{chg}$, which corresponds to the mirror current through the third transistor 304, flows into the capacitor 306, thereby charging the capacitor 306 and increasing the voltage $V_{int}$. When the clock signal F1 is low, the fourth switch 305 is open, the charging current $I_{chg}$ is zero, and the charge in the capacitor 306 is not changed.

At time $t_0$, the clock signal F2 is high and the clock signal F1 is low. As a result, the second switch 204 is on (closed) and the first switch 203 is off (open), which results in the voltage $V_{103}$ of the transmit electrode 103 being at ground, i.e., the voltage of the second power rail 206. In addition, $V_{104}$, the voltage of the receive electrode 104 and the input voltage to the voltage-to-current converter 208, is at the voltage $V_{pre}$. Between times to and $t_1$, no current flows into the capacitor 306 and, consequently, the voltage $V_{int}$ remains unchanged.

At time $t_1$, the clock signal F2 goes from high to low, which opens the second and third switches 204 and 301. The voltages $V_{103}$, $V_{104}$, and $V_{int}$ do not vary in the short interlude between times $t_1$ and $t_2$ since their corresponding nodes float during that interlude.

At time $t_2$, the clock signal F1 goes from low to high, which closes the first and fourth switches 203 and 305. The voltage $V_{103}$ of the transmit electrode 103, rises to the voltage $V_{DD}$ of the first power rail 205. In addition, due to the mutual capacitance $C_m$, the voltage $V_{104}$ at the receive electrode 104 and, consequently, of the gate of the first transistor 302, rises by $\Delta V$ to $V_{pre}+\Delta V$, where $\Delta V=C_m*V_{DD}/(C_m+C_{p2})$. Between times $t_2$ and $t_3$, while the clock signal F1 is high and the fourth switch 305 is closed, the capacitor 306 gets charged by the charging current $I_{chg}$ from the converter 208 and, as a result, the voltage $V_{int}$ rises steadily between times $t_2$ and $t_3$.

At time $t_3$, the clock signal F1 drops from high to low. Consequently, the first and fourth switches 203 and 305 open. As a result, the charging of the capacitor 306 stops, and $V_{int}$ remains constant until the next time that the clock signal F1 goes high, at time $t_5$. The voltages $V_{103}$ and $V_{104}$ do not vary in the short interlude between times $t_3$ and $t_4$ since their corresponding nodes float during that interlude.

At time $t_4$, the clock signal F2 rises from low to high. Consequently, the second and third switches 204 and 301 close. As a result, (i) the voltage $V_{103}$ drops to a ground voltage—the voltage of the second power rail 206—and (ii) the voltage $V_{104}$ drops to $V_{pre}$—the voltage of the pre-charge voltage source of the $V_{pre}$ generator 207. The clock signals F1 and F2 and the voltages $V_{103}$ and $V_{104}$ return to their respective levels of time to, and the cycle repeats. Note, however, that since the voltage change $\Delta V$ depends on the mutual capacitance $C_m$, which is variable, future iterations may see the voltage $V_{104}$ rise to correspondingly different levels when the clock signal F1 goes high. As explained below, the voltage level of $\Delta V$—equal to $C_m*V_{DD}/(C_m+C_{p2})$—determines the rate of increase of the voltage $V_{int}$ while the clock signal F1 is high.

When the clock signal F1 is high, the current $I_{chg}$ into the capacitor 306 may be represented by the equation (1) below, where, for the transistor 302, μ represents a mobility parameter, $C_{ox}$ represents the capacitance per unit area of the gate, W is the width of the channel, L is the length of the channel, and $V_{th}$ is the threshold voltage.

$$I_{chg} = \frac{1}{2}\mu C_{ox}\frac{W}{L}\left(V_{pre} + \frac{C_m \cdot V_{DD}}{C_m + C_{p2}} - V_{th}\right)^2 \quad (1)$$

If we assume that $V_{pre}=V_{th}$ and that $C_{p2}>>C_m$, then the equation (1) can be simplified into the equation (2).

$$I_{chg} \approx \frac{1}{2}\mu C_{ox}\frac{W}{L}\frac{C_m^2 \cdot V_{DD}^2}{C_{p2}^2} \quad (2)$$

When there is a touch event, the mutual capacitance $C_m$ decreases by $\Delta C_m$, and the new charging current $I'_{chg}$ may be represented by the equation (3).

$$I'_{chg} \approx \frac{1}{2}\mu C_{ox}\frac{W}{L}\frac{(C_m - \Delta C_m)^2 \cdot V_{DD}^2}{C_{p2}^2} \quad (3)$$

Note that the equation (3) may also be used in determining an increase in the mutual capacitance $C_m$ from a finger retraction event. Note that the greater the change $\Delta C_m$, the greater the corresponding change in the charging current $I_{chg}$, as indicated by the equation (4).

$$\frac{I_{chg} - I'_{chg}}{I_{chg}} = 1 - \left(\frac{C_m - \Delta C_m}{C_m}\right)^2 \quad (4)$$

Note that the use of non-linear (e.g., quadratic or exponential) voltage-to-current conversion results in greater sensitivity to mutual-capacitance changes than the conventional use of linear voltage-to-current conversion. Note that setting the voltage $V_{pre}$ lower than the threshold voltage $V_{th}$ may further increase the sensitivity of the circuit 300 to changes in the mutual capacitance $C_m$, where an increased sensitivity means a greater change in the charging current $I_{chg}$ for a given change in the mutual capacitance $C_m$. Recall, however, that $V_{pre}$ should be selected so that $V_{pre}>V_{th}-\Delta V$. In particular, a $V_{pre}$ value should be selected such that $V_{pre}>V_{th}-\Delta V_{min}$, where $\Delta V_{min}$ is a minimum expected $\Delta V$ value, which corresponds to a minimum expected value for $C_m$.

The following example illustrates the increased sensitivity resulting from reducing $V_{pre}$ below $V_{th}$. Using equation (1), above, and assuming that $\frac{1}{2}\mu C_{ox}(W/L)=1$ mho, $\Delta V_1$ (no touch)=0.5V, $\Delta V_2$ (touch)=0.4V, we get the following: (A) if $V_{pre}=V_{th}=1V$, then $I_{chg(1)}=0.25$ A and $I_{chg(2)}=0.16$ A, which represents a 36%—i.e., (0.25−0.16)/0.25—change and (B) if $V_{pre}$ is set to 0.7V, then $I_{chg(1)}=0.04$ A and $I_{chg(2)}=0.01$ A, which represents a 75% change, and, consequently, a greater sensitivity.

The discharge circuit 307 determines a present value of the mutual capacitance $C_m$ based on the time it takes the voltage $V_{int}$ to rise to a reference voltage $V_{ref}$. The discharge circuit 307 then discharges the capacitor 306, which sets the capacitance $C_{int}$ and the voltage $V_{int}$ to zero, so that the discharge circuit 307 can determine a new present value of the mutual capacitance $C_m$ based on the present time it takes the voltage $V_{int}$ to rise to the reference voltage $V_{ref}$. Consecutive determinations of the mutual capacitance $C_m$ are used to determine whether a finger has entered or exited a zone proximal to the transmit and receive electrodes 103 and 104.

Figure 5:
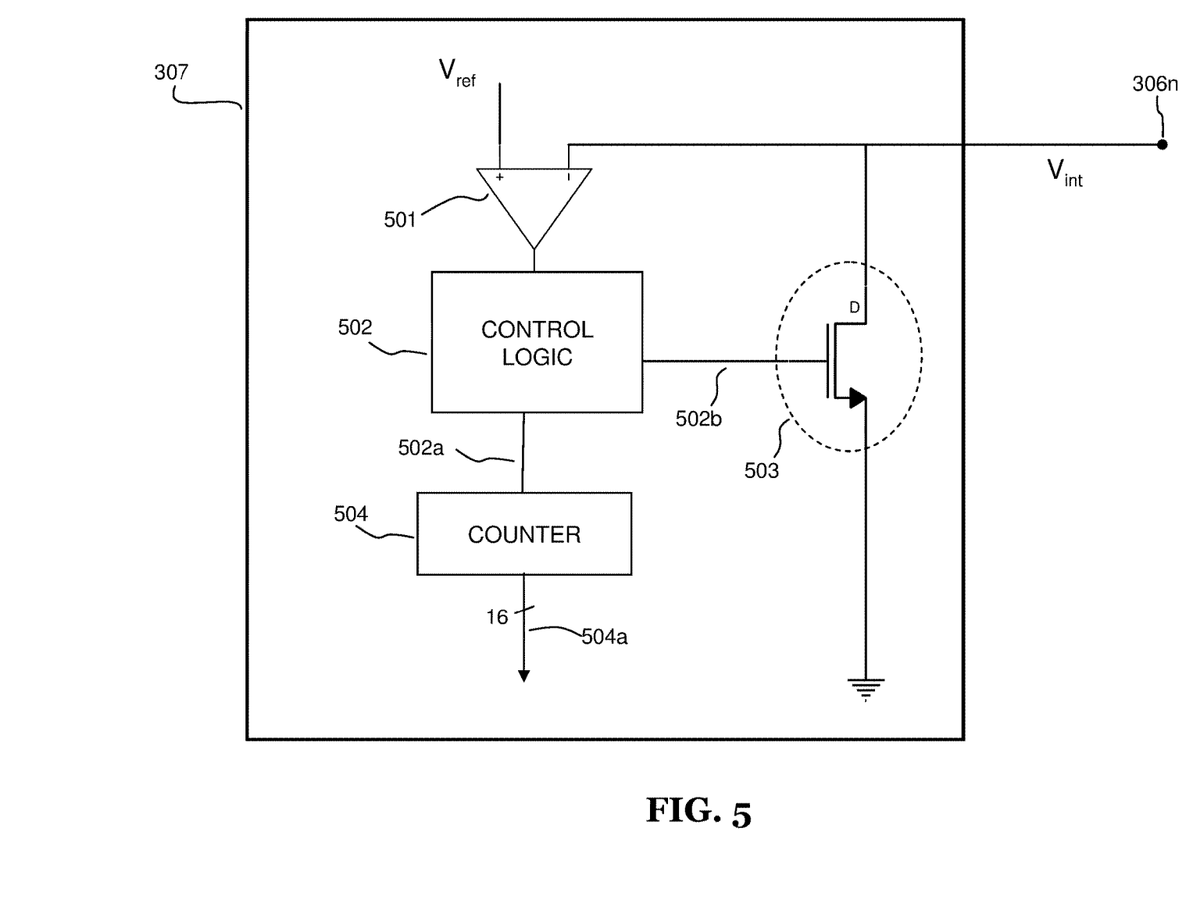
FIG. 5 is a schematic block diagram of a discharge circuit of the mutual capacitance sensing circuit of FIG. 3.

FIG. 5 is a schematic block diagram of the discharge circuit 307 of FIG. 3 in accordance with an embodiment of the invention. The discharge circuit 307 comprises a comparator 501 that compares the voltage $V_{int}$ (at the negative input) from the node 306n to a reference voltage $V_{ref}$ (at the positive input). The output of the comparator 501 is provided to a control logic module 502, which provides (i) an output 502a to a counter 504 and (ii) an output 502b to a discharge transistor 503. The counter 504 is a counter that counts the number of clock cycles that have transpired since the previous reset. When the input voltage $V_{int}$ reaches or exceeds the reference voltage $V_{ref}$, the control logic module 502 has the counter 504 output its count to additional circuitry (not shown) via the path 504a as a 16-bit binary number. Subsequently, the control logic module 502 (i) resets the counter 504 and (ii) temporarily turns on the transistor 503 to discharge the capacitor 306 and reset the voltage $V_{int}$ to ground voltage.

A higher mutual capacitance $C_m$, which indicates no touch or a finger retraction, causes a faster rise in the voltage $V_{int}$ and, consequently, a lower count number. On the other hand, a lower mutual capacitance $C_m$, indicating a touch, causes a slower rise in the voltage $V_{int}$, and, consequently, a higher count number. When the additional circuitry receives a new count number that corresponds to a particular mutual capacitance $C_m$ via path 504a, the received count number is compared to a threshold count number that corresponds to a threshold mutual-capacitance value. If the received count number is less than the threshold, then a no-touch determination is made, while, if the received count number is greater than the threshold, then a touch determination is made. Note that alternative implementations may have different and/or more-elaborate algorithms for determining whether or not a touch occurred based on the received count numbers.

Figure 6:
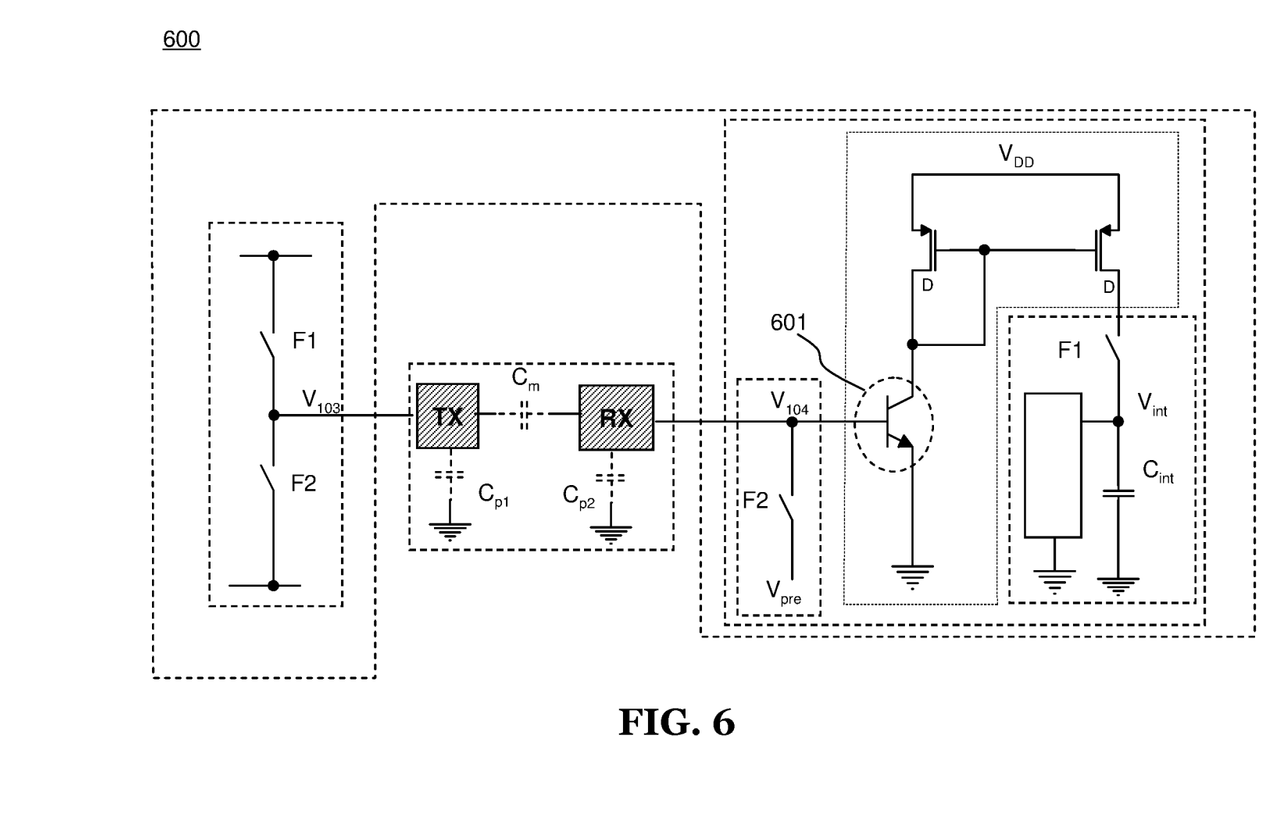
FIG. 6 is a schematic circuit diagram of the mutual capacitance sensing circuit of FIG. 2 in accordance with another embodiment of the present invention.

FIG. 6 is a schematic circuit diagram of a mutual capacitance sensing circuit 600 in accordance with another embodiment of the present invention. In the circuit 600, a NPN BJT transistor 601 is used instead of the FET first transistor 302 of the circuit 300 of FIG. 3. The operation of the circuit 600 is substantially the same as previously described for the circuit 300 of FIG. 3. The circuit 600 may exhibit even greater sensitivity to changes in the mutual capacitance $C_m$ than the circuit 300.

Note that the capacitive touch pad 101 of FIG. 1 is only one of many possible configurations for capacitive touch pads. Alternative touch pads may, for example, have (i) transmit and/or receive electrodes of different shapes, (ii) transmit and receive electrodes in different arrangements—e.g., a grid, parallel lines, or a circle, (iii) different numbers of corresponding transmit and receive electrodes—e.g. one transmit electrode for two or more receive electrodes or two or more transmit electrodes for two or more receive electrodes, (iv) transmit and receive electrodes separated differently—e.g., vertically rather than laterally, and (v) gaps and/or a substrate of different materials—e.g., glass, fiberglass, or epoxy—between the transmit and receive electrodes.

For example, one exemplary implementation comprises three linear transmit electrodes crisscrossed with four linear receive electrodes to form a twelve-key keypad, where each key (i) corresponds to a crossover (separated by a dielectric) of a transmit electrode with a receive electrode and (ii) is considered to be activated if a threshold change in mutual capacitance is detected between its corresponding transmit electrode and corresponding receive electrode.

Embodiments of the invention have been described including switches. It should be noted that these switches may be implemented using, for example, MOSFETs or other suitable transistors.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

The term "each" may be used to refer to one or more specified characteristics of a plurality of previously recited elements. When used with the open-ended term "comprising," the recitation of the term "each" does not exclude additional, unrecited elements. Thus, it will be understood that an apparatus may have additional, unrecited elements, where the additional, unrecited elements do not have the one or more specified characteristics.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

The invention claimed is:

1. An electronic device, comprising:
a transmit module connected to a transmit electrode of a touch pad; and
a receive module connected to a receive electrode of the touch pad, the receive module comprising a non-linear voltage-to-current converter, a pre-charge voltage generator, and an integrator, wherein:
the transmit and receive electrodes have a mutual capacitance $C_m$;
the transmit module alternates between a first state and a second state of, respectively, charging and discharging the transmit electrode;
the non-linear voltage-to-current converter receives a control voltage from the receive electrode and the pre-charge voltage generator having a level that depends on the mutual capacitance, the state of the transmit module, and a pre-charge voltage $V_{pre}$ provided by the pre-charge voltage generator;
the control voltage is at a first voltage level in the first state and at a second voltage level in the second state;
the non-linear voltage-to-current converter provides to the integrator a charging current $I_{chg}$ dependent on the control voltage; and
the integrator generates a value corresponding to the mutual capacitance based on the charging current;
the non-linear voltage-to-current converter comprises:
a first transistor having first, second and third terminals, wherein the control voltage is provided to the first terminal to control a current flow between the second and third terminals; and
a current mirror having an input connected to the second terminal of the first transistor, and an output that is provided to the integrator.

2. The device of claim 1, wherein the first transistor is a field-effect transistor (FET) and the first terminal is the gate of the first transistor.

3. The device of claim 1, wherein the first transistor is a bipolar junction transistor (BJT) and the first terminal is the base of the first transistor.

4. The device of claim 1, wherein the first transistor has a threshold activation voltage, and the pre-charge voltage is set to equal the threshold activation voltage.

5. The device of claim 1, wherein:
the first transistor has a threshold activation voltage;
the pre-charge voltage is set to be less than the threshold activation voltage;
a difference ΔV between the first and second voltage levels of the control voltage is variable and depends on the mutual capacitance $C_m$;
a minimum expected voltage change $\Delta V_{min}$ is set to a minimum expected value for the difference ΔV; and
the pre-charge voltage is set to a value greater than the difference between the threshold activation voltage and the minimum expected voltage change $\Delta V_{min}$.

6. The device of claim 5, wherein:
the second voltage level of the control voltage is the pre-charge voltage $V_{pre}$; and
the first voltage level of the control voltage is a sum of the pre-charge voltage $V_{pre}$ and the difference ΔV.

7. The device of claim 5, wherein:
the transmit module comprises a first switch connected between a power supply voltage $V_{DD}$ rail and the transmit electrode;
the receive electrode and a ground plane have a parasitic capacitance $C_{p2}$; and $$\Delta V = \frac{C_m \cdot V_{DD}}{C_m + C_{p2}}.$$

8. The device of claim 1, wherein:
the touch pad includes a ground plane and the transmit electrode and the ground plane have a parasitic capacitance $C_{p1}$; and
the receive electrode and the ground plane have a parasitic capacitance $C_{p2}$.

9. The device of claim 1, wherein the transmit module comprises:
a first switch connected between a power supply voltage $V_{DD}$ rail and the transmit electrode, and controlled by a first clock signal; and
a second switch connected between a ground rail and the transmit electrode, and controlled by a second clock signal,
wherein:
the transmit module is in the first state when the first clock signal is high;
the transmit module is in the second state when the second clock signal is high; and
the first and second clock signals are non-overlapping.

10. The device of claim 9, wherein the first and second clock signals are asymmetrical.

11. The device of claim 9, wherein:
the pre-charge voltage generator comprises a voltage regulator and a pre-charge switch;
the pre-charge switch is connected between the voltage regulator and the receive electrode; and
the pre-charge switch is controlled by the second clock signal such that, in the second state, the pre-charge switch is closed and the control voltage is at the pre-charge voltage.

12. The device of claim 9, wherein:
the integrator comprises an integrating capacitor and an integrator switch;
the integrator switch is connected between the non-linear voltage-to-current converter and the integrating capacitor;
the integrating capacitor is connected between the integrator switch and a ground rail; and
the integrator switch is controlled by the first clock signal to provide the charging current to the integrating capacitor in the first state.

13. The device of claim 12, wherein the integrator further comprises a discharge module connected in parallel with the integrating capacitor, wherein the discharge module discharges the integrating capacitor in response to the voltage across the integrating capacitor exceeding a reference voltage.

14. The device of claim 13, wherein the discharge module further comprises a counter that counts clock cycles while the voltage across the integrating capacitor increases.

15. A mutual capacitance sensing circuit, comprising:
a transmit module connected to a transmit electrode of a touch pad, wherein the transmit module alternates between a first state and a second state of, respectively, charging and discharging the transmit electrode, and wherein the transmit module comprises:
a first switch connected between a power supply voltage $V_{DD}$ rail and the transmit electrode, and controlled by a first clock signal; and
a second switch connected between a ground rail and a node between the first switch and the transmit electrode, and controlled by a second clock signal, wherein the transmit module is in the first state when the first clock signal is high, in the second state when the second clock signal is high, and the first and second clock signals are non-overlapping; and
a receive module connected to a receive electrode of the touch pad, wherein the transmit and receive electrodes have a mutual capacitance $C_m$,
wherein the receive module comprises:
a non-linear voltage-to-current converter that receives a control voltage from the receive electrode and generates a charging current $I_{chg}$ that depends on the control voltage,
a pre-charge voltage generator that generates a pre-charge voltage $V_{pre}$, and
an integrator that receives the charging current $I_{chg}$ from the voltage-to-current converter and generates a value corresponding to the mutual capacitance $C_m$ based on the charging current,
wherein:
the control voltage has a level that depends on the mutual capacitance $C_m$, the state of the transmit module, and the pre-charge voltage $V_{pre}$; and
control voltage is at a first voltage level in the first state and at a second voltage level in the second state.

16. The sensing circuit of claim 15, wherein:
the pre-charge voltage generator comprises a pre-charge switch connected between a node located between the receive electrode and the voltage-to-current converter, and a pre-charge voltage source, wherein the pre-charge switch is controlled by the second clock signal such that, in the second state, the pre-charge switch is closed and the control voltage is at the pre-charge voltage;
the voltage-to-current converter comprises:
a first transistor having gate connected the node located between the receive electrode and the voltage-tocurrent converter for receiving the control voltage, and a source connected to ground, and
a current mirror having an input connected to a drain of the first transistor, and an output; and the integrator comprises:
an integrator switch having a first terminal connected to the output of the current mirror for receiving the charging current $I_{CHG}$ and a second terminal, and
an integrating capacitor connected between the second terminal of the integrator switch and ground,
wherein the integrator switch is controlled by the first clock signal to provide the charging current $I_{CHG}$ to the integrating capacitor in the first state.

* * * * *